(12) United States Patent
Nobileau

(10) Patent No.: US 9,052,054 B2
(45) Date of Patent: Jun. 9, 2015

(54) FOLDABLE COMPOSITE TUBULAR STRUCTURE

(76) Inventor: Philippe Constant Nobileau, Villefranche sur Mer (FR)

( * ) Notice: Subject to any disclaimer, the term of this patent is extended or adjusted under 35 U.S.C. 154(b) by 725 days.

(21) Appl. No.: 13/311,019

(22) Filed: Dec. 5, 2011

(65) Prior Publication Data

US 2012/0145381 A1 Jun. 14, 2012

Related U.S. Application Data

(63) Continuation-in-part of application No. 10/416,773, filed on Jul. 6, 2005, now Pat. No. 7,490,676, and a continuation-in-part of application No. PCT/IB2006/052738, filed on Aug. 8, 2006, and a continuation-in-part of application No. 11/953,335, filed on Dec. 10, 2007, now Pat. No. 8,069,900.

(51) Int. Cl.
| | | |
|---|---|---|
| *E21B 17/00* | (2006.01) | |
| *F16L 55/165* | (2006.01) | |
| *E21B 43/10* | (2006.01) | |
| *E21B 17/08* | (2006.01) | |
| *E21B 17/14* | (2006.01) | |
| *E21B 33/12* | (2006.01) | |
| *E21B 33/14* | (2006.01) | |
| *E21B 41/00* | (2006.01) | |
| *F16L 1/038* | (2006.01) | |
| *E21B 19/22* | (2006.01) | |

(52) U.S. Cl.
CPC ........... *F16L 55/1656* (2013.01); *E21B 43/103* (2013.01); *F16L 55/1654* (2013.01); *E21B 17/08* (2013.01); *E21B 17/14* (2013.01); *E21B 33/1212* (2013.01); *E21B 33/14* (2013.01); *E21B 41/0042* (2013.01); *E21B 43/105* (2013.01); *F16L 1/038* (2013.01); *F16L 55/1657* (2013.01); *E21B 19/22* (2013.01)

(58) Field of Classification Search
CPC ....... E21B 19/22; E21B 43/10; E21B 43/103; E21B 41/0042
USPC ........... 166/206, 208, 242.1, 242.2, 384, 380; 138/119, 137
See application file for complete search history.

(56) References Cited

U.S. PATENT DOCUMENTS

| | | | | |
|---|---|---|---|---|
| 4,124,985 | A * | 11/1978 | Maimets | 405/150.1 |
| 5,337,823 | A * | 8/1994 | Nobileau | 166/277 |
| 5,494,106 | A * | 2/1996 | Gueguen et al. | 166/277 |
| 5,918,677 | A * | 7/1999 | Head | 166/380 |
| 6,513,588 | B1 * | 2/2003 | Metcalfe | 166/89.2 |
| 7,025,580 | B2 * | 4/2006 | Heagy et al. | 425/11 |
| 7,152,673 | B2 * | 12/2006 | Lohbeck | 166/207 |
| 7,178,601 | B2 * | 2/2007 | Burge | 166/380 |

* cited by examiner

*Primary Examiner* — Kenneth L Thompson
*Assistant Examiner* — Michael Wills, III

(57) ABSTRACT

Foldable pipe-in-pipe composite tubular structure having between pipes after rounding and hardening a filling material associating the layers to enhance the structure mechanical performance mostly in collapse resistance. Improvements are related to increase foldability by having at least one of the pipe made of two layers and in case of transportation on a reel in continuous length the capability of circulating most of the hardenable filling material when the pipe is still on the reel and in case of wellbore casing application the capability of connecting sealingly successive strings of casing

11 Claims, 9 Drawing Sheets

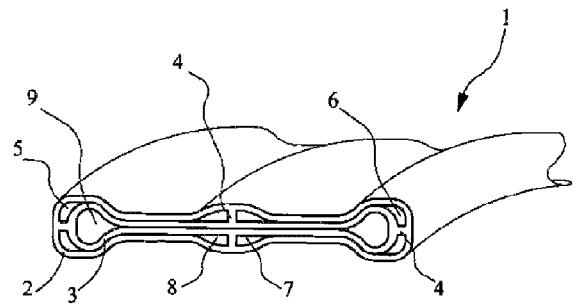
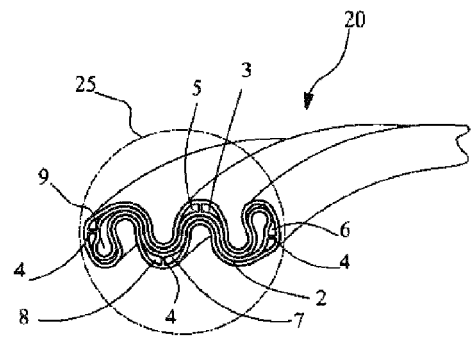
Figure 1A  Figure 2A
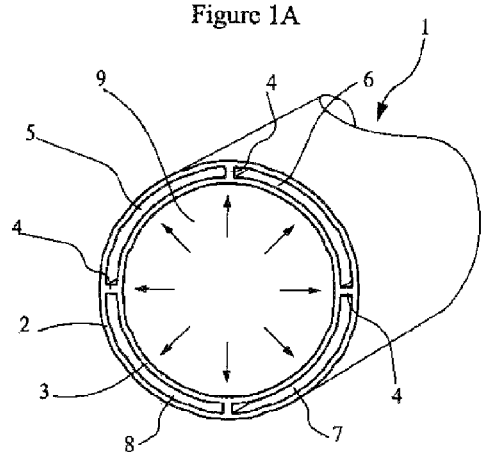
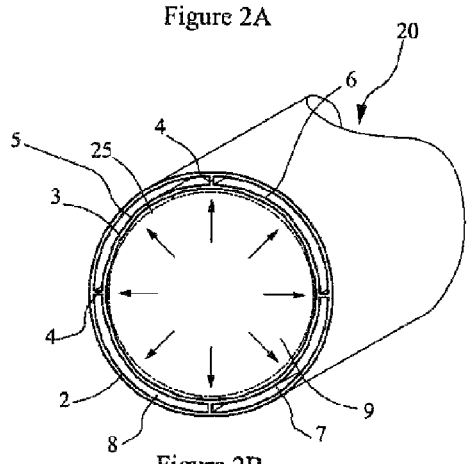
Figure 1B  Figure 2B
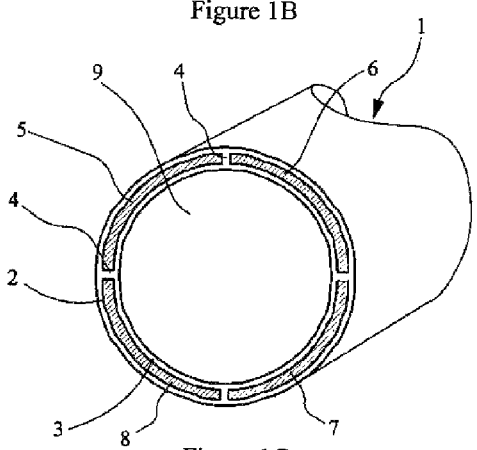
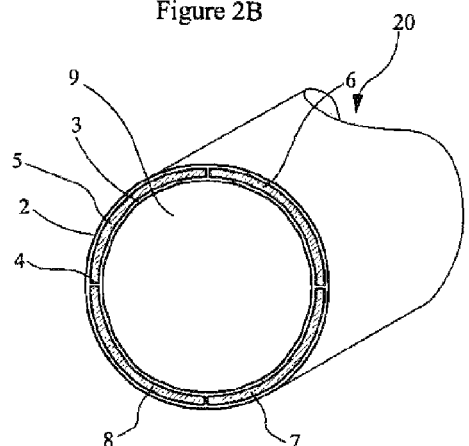
Figure 1C  Figure 2C

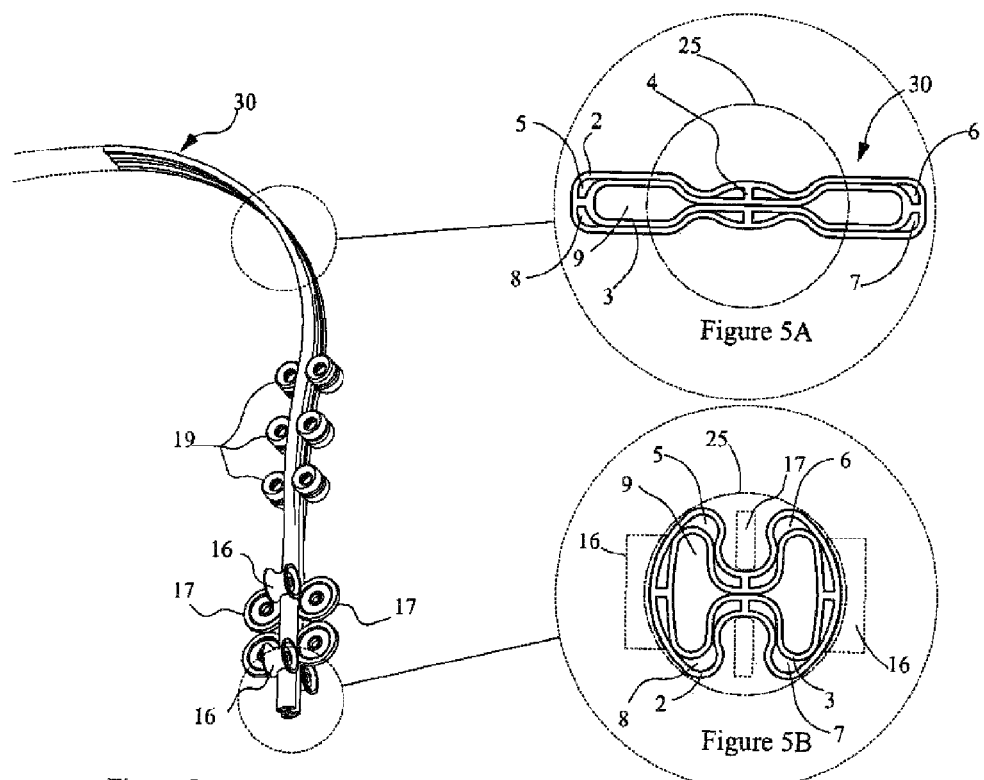
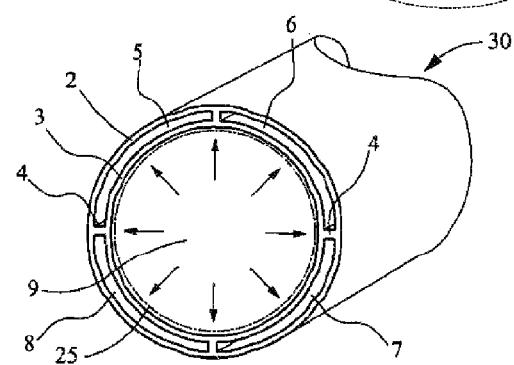
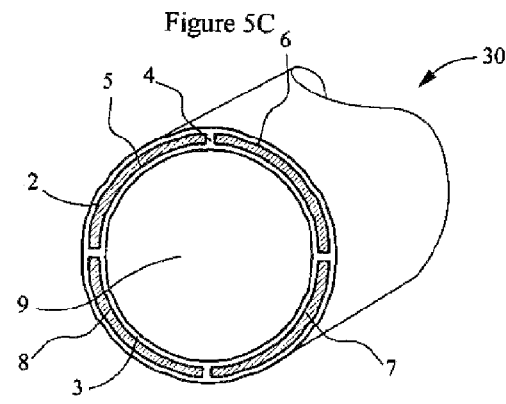

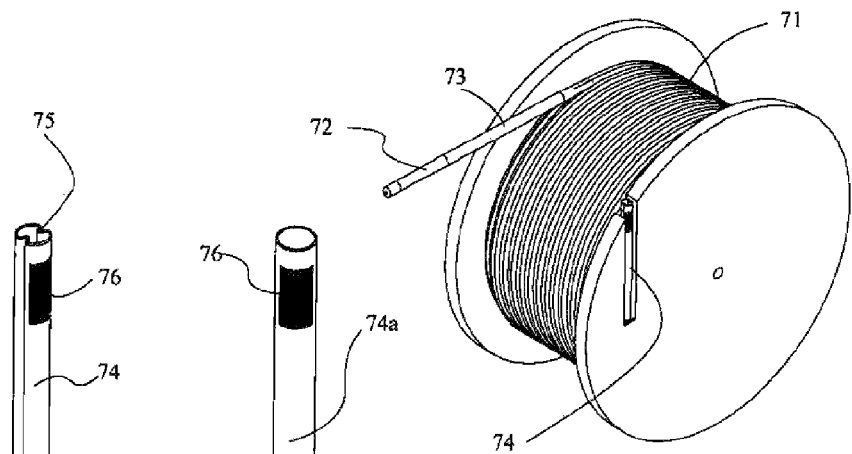
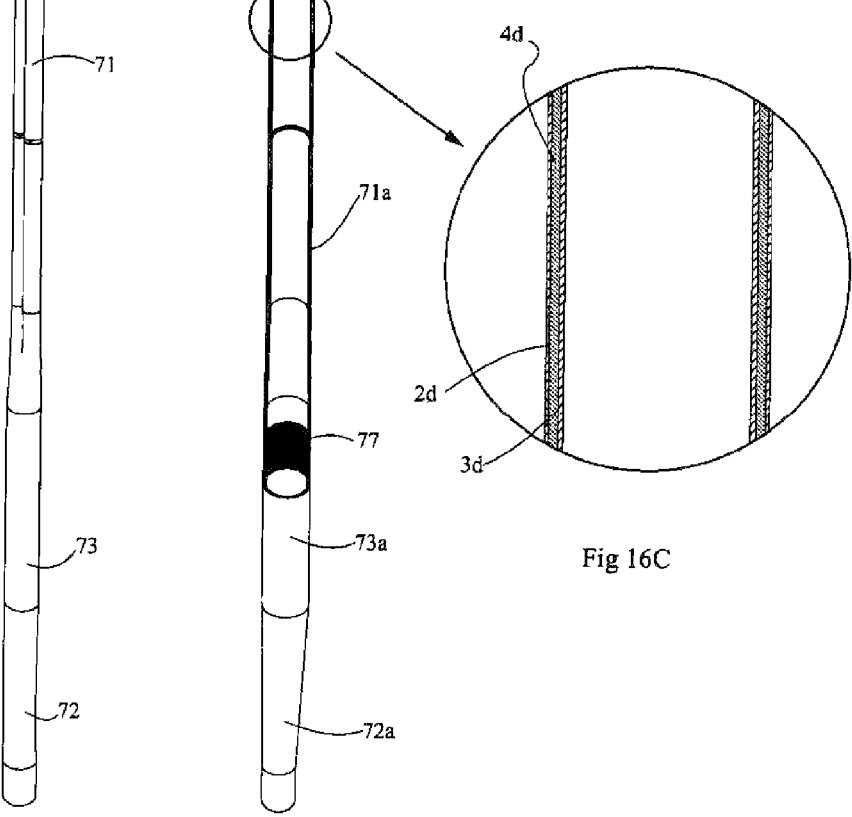
Fig 15
Fig 16C
Fig 16A  Fig 16B

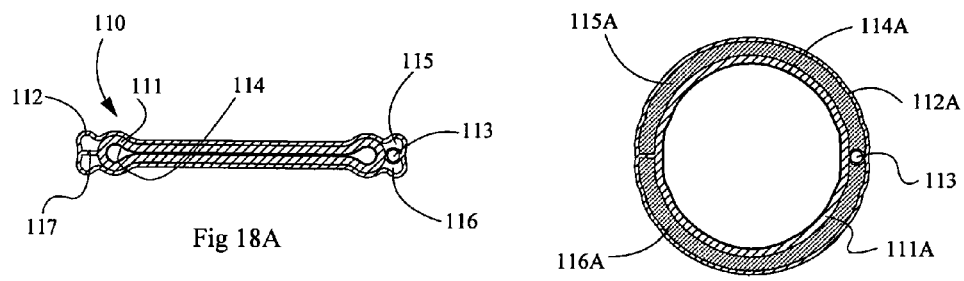
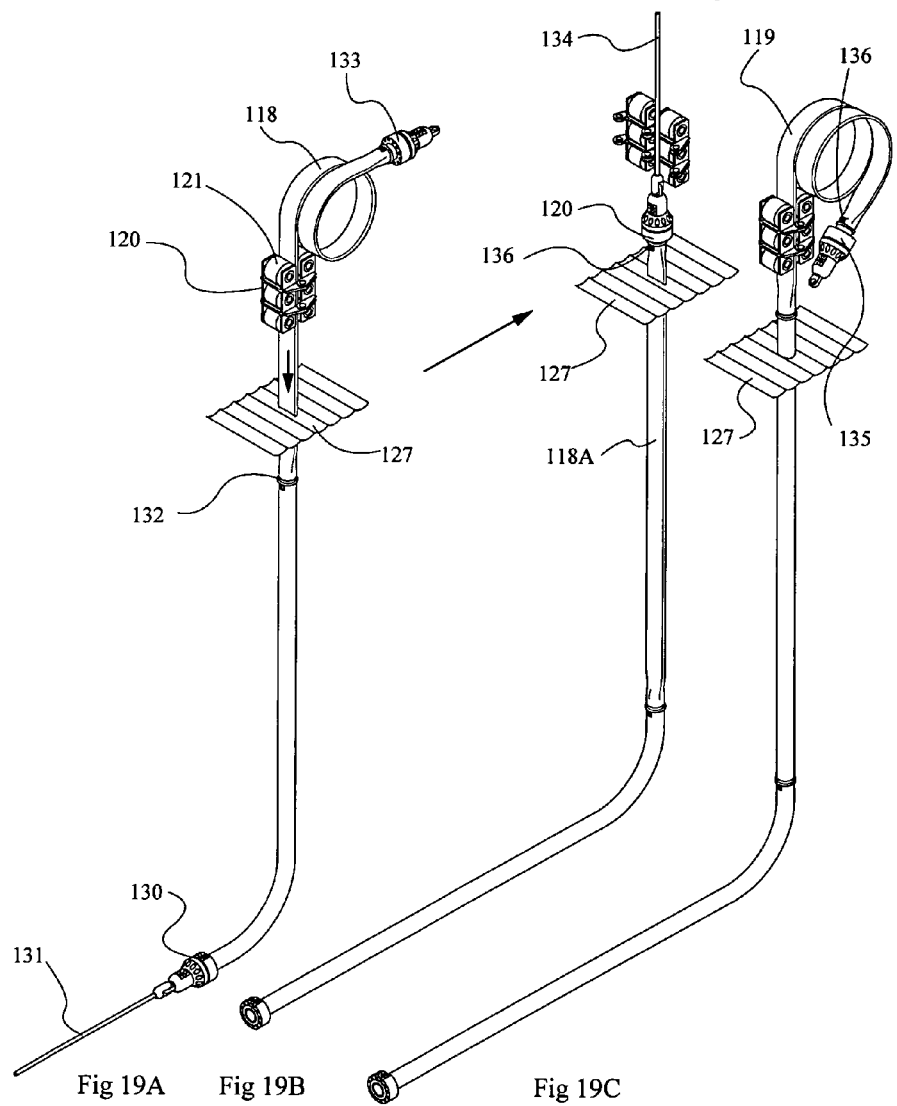

FOLDABLE COMPOSITE TUBULAR STRUCTURE

CROSS-REFERENCE TO RELATED APPLICATION

This application is a continuation in part of application Ser. No. 10/416,773 filed Oct. 8, 2001 now U.S. Pat. No. 7,490,676, a continuation in part of application PCT/IB2006/052738 filed Aug. 8, 2006 having a priority application FR0508438 filed Aug. 8, 2005 and a continuation in part of application Ser. No. 11/953,335 filed Dec. 10, 2007 now U.S. Pat. No. 8,069,900. The entire disclosures of the prior applications are incorporated herein by this reference.

TECHNICAL FIELD

The present invention relates to well casing and oil transportation pipeline and in particular tubular structures requiring mechanical performances enhancement mostly in collapse resistance in-situ or after installation.

BACKGROUND ART

New methods for installation of tubular structures in well have recently been introduced like mono-diameter/monobore casing systems but have reduced mechanical performances, mostly in collapse resistance.

The patent U.S. Pat. No. 7,159,666 of the applicant, offers a solution to improve the collapse resistance, but at the expense of substantial complications in the installation and without taking advantage of the complete steel section.

An advantageous solution is by winding the continuous tubular member on spools to allow to store the pipes in continuous length. This solution allows pipe transportation of continuous length saving assembling time on location.

However, beyond a certain pipe diameter, the dimensions of the necessary spool to store the pipe become prohibitive, as well as the necessary equipment for its unwinding. For instance, on offshore laying vessels, the size of the spool is such that it has to be part of the vessel and the pipe must be wound from a shore construction site close to the laying location. In well casing, the road size constraints and the requirements to locate big size spool on rigs make this solution less attractive if not impossible.

The patent U.S. Pat. No. 3,104,703 of Rike and al offers a solution to reduce the spool size by flattening the tubular lengthwise to reduce the spool diameter. The patent U.S. Pat. No. 5,794,702 of the applicant offers also a longitudinal folding of the tubular which also reduces its radial dimensions making easier to lower it into the well. The patent U.S. Pat. No. 8,069,900 of the applicant offers an improvement in enhancing the collapse resistance of the tubular by creating a composite wall.

DISCLOSURE OF INVENTION

One purpose of the invention is to facilitate the deployment of a composite tubular as a wellbore casing by circulating the hardening material when most of the composite tubular structure is still on the rig floor winded on a reel, ready to be lowered into the well.

Another purpose of the invention is to enhance the mechanical performances of the deployed foldable tubular structure by having at least one of the two pipe forming the pipe-in-pipe configuration made of two layers in intimate contact after deployment.

A last purpose of this invention is to connect sealingly successive strings of casing made of composite tubular structure.

BRIEF DESCRIPTION OF DRAWINGS

The purposes, objects and characteristics of the invention will be more apparent after reading the description which follows referring to the drawings in which:

FIGS. 1A, 1B and 1C are isometric sections of pipeline/flowline of composite tubular structure during the successive stages of deployment, FIGS. 2A, 2B and 2C are isometric sections of casing in monobore/monodiameter configuration during the successive stages of deployment.

The FIG. 5 is an isometric view of the injector of a wound casing.

Figure 6A:
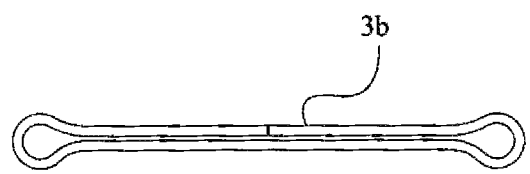
Figure 6B:
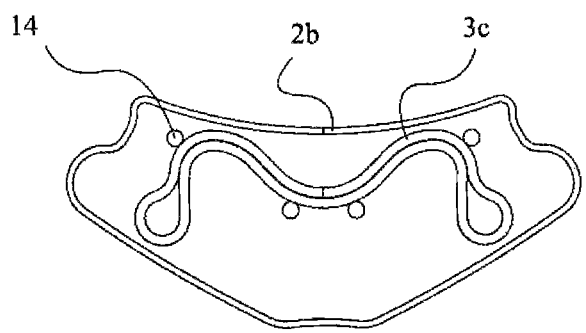
Figure 6C:
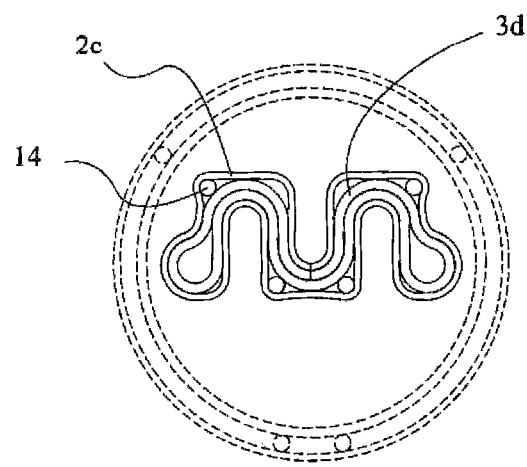
Figure 7:
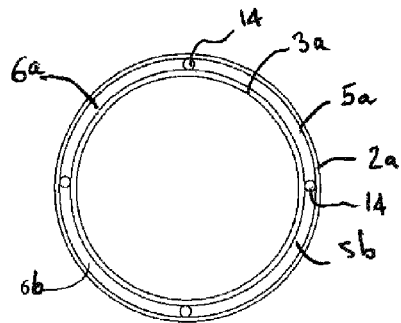

FIGS. 5A, 5B, 5C and 5D are sections of casing during the successive stages of deployment after having been unflatened prior to enter the well, FIGS. 6A to 6C are sections of casing during the manufacturing of composite tubular structure from prefolded pipe, reeling and deployment, FIGS. 7 to 10 are sections of composite tubular structure for wellbore construction where the section of the cavity is kept substantially constant during the reeling, reforming prior to enter the well and deployment, FIGS. 11 to 14 are sections of the invention for wellbore construction where the outer pipe is made of two layers, FIG. 15 is an isometric view of a length of casing of composite tubular structure reeled on a reel.

FIGS. 16A and 16B are isometric views of the length of casing of composite tubular structure straightened/folded and inflated.

FIG. 16C is enlarged view of the intermediate section of FIG. 16B.

Figures 17A, 17B, 17C:
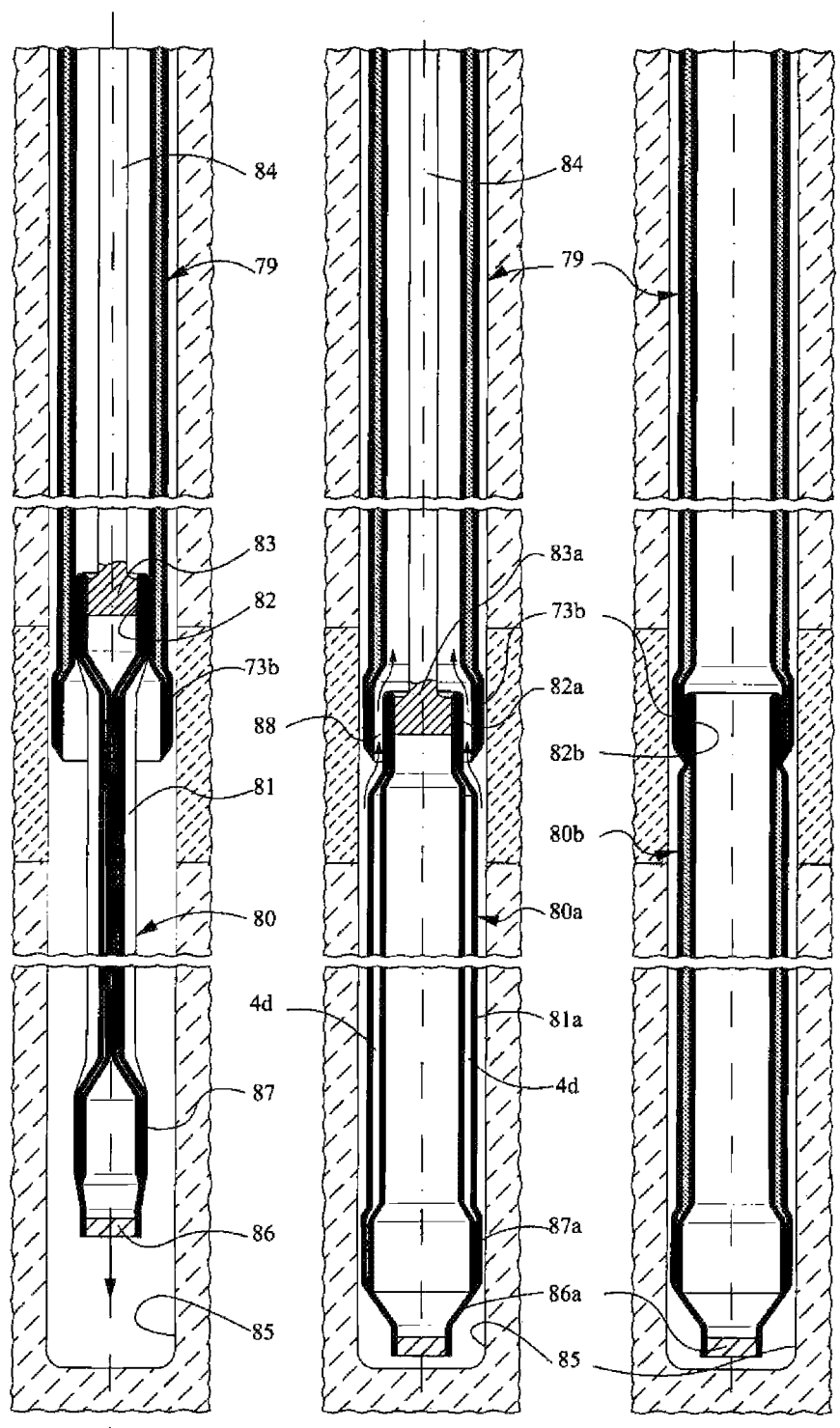

FIG. 17A to 17C are sectional views of the connection between strings of composite tubular casing installed in a mono-diameter fashion.

FIGS. 18 and 19 are alternative sections of pipeline/flowline reeled and deployed.

DETAILED DESCRIPTION

It is to be understood that the tubular structure described here comprises any tubular structure not having to be straight and possibly having a variable section. For instance, the tubular structure can have a conical portion or create a pipe embranchment as it is the case in a junction from which a main pipe splits into two or several pipes.

To make the understanding of the following description easier, we will use the term longitudinal when it is parallel to the direction of the tubular structure, and the term radial to indicate that it is somewhat in the plan perpendicular to the direction of the tubular structure. For casing applications, acknowledging that the string went down in the well vertically, we will use top, bottom, downward, upward, upper or lower.

A composite tubular structure is represented in reference to FIGS. 1A, 1B and 1C. The installation of a structure, which could either be a pipeline/flowline or a downhole casing as in the present description, starts from a multi-layered structure 1 in a longitudinally flattened shape (FIG. 1A). The multi-layered structure 1 which will most often be metallic includes a wall composed of a internal layer 3 and a external layer 2 of identical thickness, each pressed against one another and linked up by four bulkheads 4. Under a longitudinal flattened shape, the section of the structure is optimized to minimize its folding inertia on one radial axis to be easily wound on a spool of small diameter.

The internal layer 2 isolates an internal volume 9 and along with the external layer 3 and the four bulkheads 4, isolate four intermediate cavities 5, 6, 7 and 8.

The volume 9 corresponds to the internal volume of the tubular structure while the intermediate cavities 5, 6, 7, 8 allow the circulation of fluid between both structural layers. The cavities 5, 6, 7, 8 and volume 9 are filled with fluid such as water during the laying offshore or the lowering into the well of the tubular structure in order to prevent collapse of the structural layers 2 and 3 due to raising outside pressure. The manufacture of multi-layered metallic structure 1 in its initial shape can be accomplished by fabricating the structure in a cylindrical shape first (as in FIG. 13A) then by crushing it within the plastic range of the metal under a mechanical press or set of rollers to give the required section. A heat treatment can be advantageously used after this crushing so as to eliminate the residual stresses resulting from the cold working deformation of the fabrication and/or flattening.

Once the metallic structure has been installed in situ, it is deployed in a substantially cylindrical shape by applying internal forces. Preferably the internal forces are generated by fluid pressure inflating the structure (FIG. 1B). The pressurized fluid is injected into the volume 9 to deploy the internal structural layer 3. The volume 9 and the cavities 5, 6, 7 and 8 can communicate through a pressure relief valve, so that the pressurized fluid is also transmitted to the cavities 5, 6, 7 and 8 but with a lower pressure, because this pressure will be subtracted to the internal pressure of the volume 9 so that both structural layers 2, 3 are subjected to similar internal pressure differentials. A pressure relief valve (not shown) between the cavities 5, 6, 7 and 8 and the outside could also be located to limit differential pressure across the structure and avoid bursting of one of the structural layers. These valves will be advantageously located on the running tool used to run and deploy the deployable tubular structure in place.

Once the metallic structure takes a substantially cylindrical shape, a cement slurry or alternative hardenable material is circulated between layers through cavities 5, 6, 7 and 8 (FIG. 1C). The cement slurry can be circulated in cavities 5, 6, 7 and 8 at the same time or alternatively using some cavities as return path by connecting them at the end of the pipe. Moreover, the pressure in the cement slurry will be able to contribute to the deployment of the metallic layers.

A second composite tubular structure is represented referring to FIGS. 2A, 2B and 2C and illustrate the use of the principle of the invention as wellbore casing and particularly for mono-diameter casing. As before (FIG. 1A), the deployment of this tubular structure starts from a multi-layered metallic structure 20 in a somewhat longitudinally folded shape. The multi-layered metallic structure 20 includes a wall composed of an internal layer 3 and an outside layer 2 of identical thicknesses, each pressed against itself and linked up by four bulkheads 4.

Under its longitudinally crushed shape, the structure folding is optimised at the same time to minimize its bending inertia in one first axis to facilitate winding on spool of small dimension but also in order that the radial dimension perpendicular to the first axis is less than the diameter of a drift circle 25 in order to be able to lower it directly into a well having a passage with a drift circle 25. The volume 9 corresponds to the internal volume of the cased well while cavities 5, 6, 7 and 8 allow the circulation of fluid between both structural layers 2 and 3. Cavities 5, 6, 7 and 8 and volume 9 are filled with fluid such as water during lowering into the well to prevent collapse of the structural layers 2 and 3 from the increasing outside pressure with the depth.

Once the metallic structure 20 is installed into the well, it is deployed in a substantially cylindrical shape (FIG. 2B) with the aid of pressurized fluid so that the internal layer 3 has all its internal radial dimensions larger or equal to the drift diameter 25 according to the running process previously described.

Once the metallic structure 20 is deployed in a substantially cylindrical shape, a cement slurry is circulated between layers in cavities 5, 6, 7 and 8 (FIG. 2C) also according to the running process previously described.

Alternatively the number of intermediate cavities can be reduced and the thickness of the structural layers 2, 3 can be substantially different.

FIGS. 7 to 10 illustrate an alternative to composite tubular structure where the internal pipe 3a is substantially thicker than the outside pipe 2a. This allows when folded in the tight inverted V shape, as on FIG. 9, to reduce the cold working during deployment by locating, in the inside part of the fold, the thinner outer pipe first which accept the tightest radius of folding and then the thickest inner pipe with a larger radius of curvature. The bulkheads can be replaced by rod spacers 14 which are not a sealed barrier between the cavities 5a, 5b, 6a and 6b. The rod spacers 14 can be simply tack welded on the inner pipe 3a.

Another composite tubular structure is represented referring to FIGS. 5, 5A, 5B, 5C and 5D. The deployment starts from multi-layered metallic casing structure 30 in a longitudinally flattened shape. The multi-layered metallic structure 30 includes a wall composed of an internal layer 3 and an outside layer 2 of identical thicknesses, each pressed against itself and linked up by four bulkheads 4. Under a longitudinal flattened shape (FIG. 5A), the section of the structure is optimized to minimize its folding inertia to be easily wound on a spool of small diameter. It features a radial dimensions larger than the diameter of the drift circle 25.

After unwinding and straightened by rollers 19 and before being lowered into the well, the metallic structure 30 is deformed in the plastic range of the metal by mechanical action of rollers 16 and pebbles 17 which apply a lateral pressure directly over the outer pipe 2 and indirectly over the inner pipe 3 so that its radial dimensions is reduced to fit the drift circle 25 (FIG. 5B). While rollers 16 press the metallic structure 30 laterally, the pebbles 17 maintain in contact the internal walls along the perpendicular crushing axle. Due to the possibility of maintaining a strong pressure on the tubular structure by contacting the internal walls, pebbles 17 can also transmit tension to the casing, as for instance to carry off the casing weight.

Once the deployable casing is lowered into the well, it is deployed in a substantially cylindrical shape (FIG. 5C) by pressurised fluid inflation, so that the internal layer 3 has all its internal radial dimensions larger or equal to the diameter of the drift circle 25.

Once the metallic structure 30 is deployed in a substantially cylindrical shape, a cement slurry and/or a polymer resin is circulated between layers in zones 5, 6, 7 and 8 (FIG. 5D) according to the running process previously described.

Figure 3A:
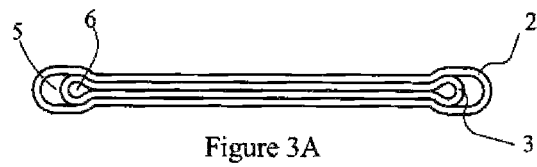
FIGS. 3A and 3B are respectively sections of pipeline/flowline of composite tubular structure in the initial configuration and in the final configuration.
Figure 3B:
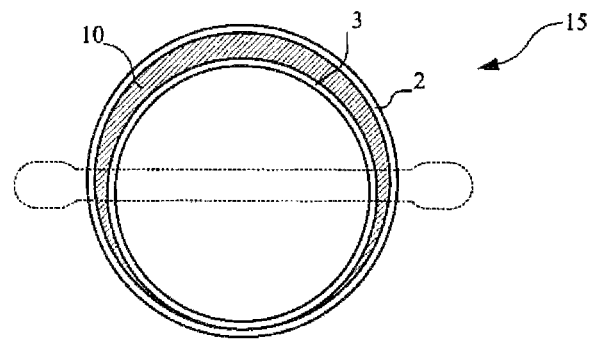

Other composite tubular structure of the invention can be considered using the principle of the invention. For instance, referring to FIGS. 3A and 3B, both structural pipe external 2 and internal 3 of the tubular structure 15 can be separated from one another with or without any spacing device, but they will be permanently attached at least at one point along the length of the structure to prevent any substantial longitudinal differential displacement of the structural layers 2 and 3 during deployment. The advantage of such configuration is the easiness of manufacturing. In this case, after deployment, the cavity 10 filled with cement will not be of constant thickness around the periphery of the structure. Nevertheless, the collapse resistance and thermal insulation will however be higher than the equivalent single layer structure.

Figure 4A:
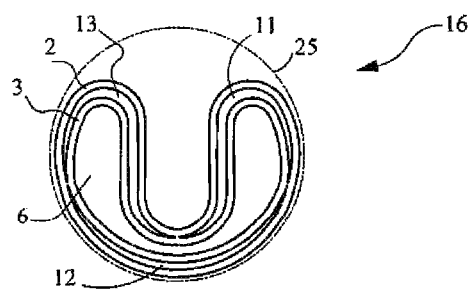
FIGS. 4A and 4B are respectively of composite tubular structure in monobore/monodiameter casing configuration while lowering into the well and in the final configuration downhole.
Figure 4B:
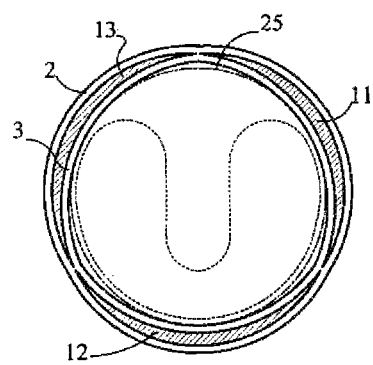

Alternatively, both structural layers external 2 and internal 3 can be mutually merged in one or several points. In the example of FIGS. 4A and 4B, the structural layers are merged in three points so as to delimit three intermediate cavities 11, 12 and 13 forming so the equivalent of three beams which assembled together can resists efficiently to collapse pressure.

Additionally, by keeping with the principle of the invention, cement slurry can be placed before deploying the structure. It requires that the volumes of the intermediate cavities are equal before and after deployment, as it is the case for instance for the cavities 11, 12 and 13 of the FIGS. 4A and 4B or 5a, 5b, 6a and 6b of the FIGS. 7 to 14.

Manufacture of the tubular structure could be made by welding available straight length of metal pipe corresponding to the internal structural layer to form a first sealed pipe, then by threading and welding straight length of metal pipe corresponding to the outside structural layer. Spacers will sometimes be installed between the pipes which will be able to create in certain cases more or less sealed bulkheads between the intermediate cavities. In case no spacer are placed, and the inner layer end-up totally offset to one side of the outer layer, a substantial increase in collapse resistance is nevertheless achieved with the hardened material located between the pipe-in-pipe cavity.

In the case continuous length of deployable tubular structure will be necessary, the manufacture could be combined with known techniques of ERW continuous pipe manufacturing by associating on the same production line two continuous pipe manufacturing units generating the pipe, by deformation of a metal strip under rollers and pebbles and closing the tube so formed by electrical welding. Between both continuous pipe manufacturing units, spacer strips will be able to be added by electrical welding. Before flattening such multi-layered tubular structure, a hydrostatic test of the internal pipe will be able to be accomplished between two expansible plugs connected by a tension leg to transmit from one plug to the other the pressure end effect. This testing assembly will test by section the manufactured tubular structure and will be able to move from tested length to the next by quick translation to cope with tubular structure continuous production unit speed.

So, after one length has been tested, pressure will be relieved and the cup tester type seal of the plugs retracted to move to the next length without interrupting production. Also the external pipe could be tested from the outside in a similar way. Finally, after hydrostatic test(s), the tubular structure will be able to be crushed, flat or with a specific profile, and wound on a spool. It might be necessary to accomplish a heat treatment to relieve the residual stresses from the manufacturing and the possible quenching and tempering needed to get the final mechanical properties aimed. This will be able to be done in a continuous manner on the manufacturing chain or separately in an oven when a substantial length of deployable tubular structure has been fabricated and wound.

FIG. 6A to 6C illustrate an alternative manufacturing where the ERW continuous pipe manufacturing unit does not make circular pipe but preformed inner flattened pipe 3b, which is then rolled to 3c waved shape. Then spacer rod 14 or balls are tack welded on the outside of the wavy pipe and a contoured shape 2b pipe is preformed around and is rolled in a somehow rectangular shape to fit inside the same tubular structure once deployed.

FIGS. 7 to 10 illustrate an improvement of the foldable composite tubular structure where the cavities section is kept constant as in FIGS. 4A and 4B throughout the transportation and deployment. This allows to circulate the hardening materiel when the composite tubular structure is still on the reel prior of unwinding and greatly simplify in case of wellbore construction the dowhole operation of cavity filling.

Figure 8:
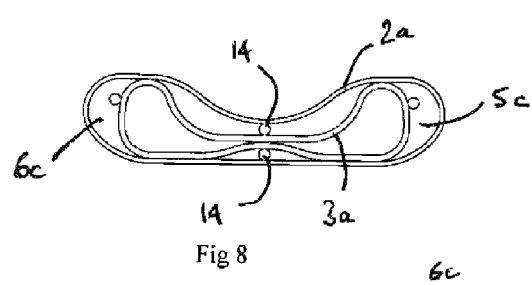
Figure 9:
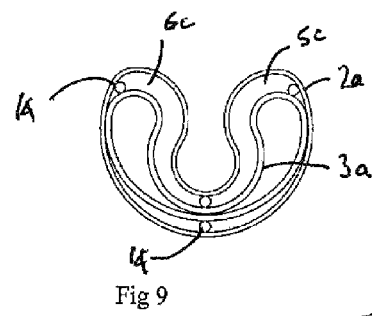
Figure 10:
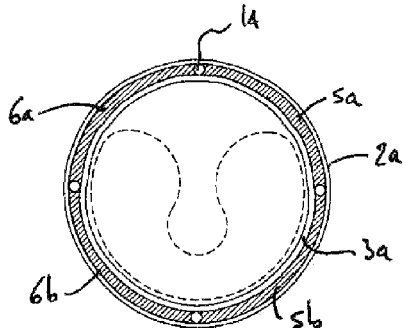
Figure 11:
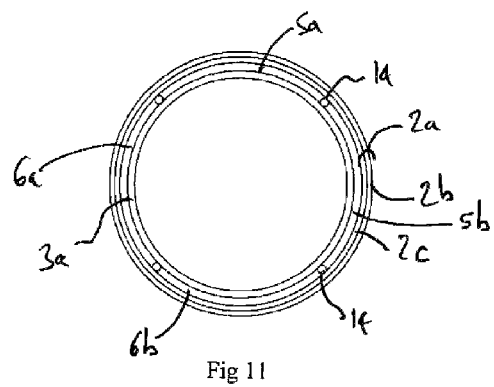

The cavity volume 5c and 6c remain substantially constant due to the fact that the section separated by non sealing spacers communicate and the area of 5c=area of 5a+area of 5b and the area of 6c=area of 6a+area of 6b, on either the flattened configuration illustrated in FIG. 8 for reel transportation, folded configuration illustrated in FIG. 9 which is used during the lowering into the well and the final deployed configuration of FIG. 10.

To prevent voids in the filling of the cavities, it is considered advantageous that when on the reel the cavities will be vacuumed to remove air.

It is also considered advantageous that the cavity(ies) will be filled with the hardenable material to prevent collapse by hydrostatic head when sinking into the well fluid or the sea water.

To compensate for hardening material setting shrinkage it is also considered advantageous to maintain pressure and continue supplying hardenable material while setting or curing.

The requirement to add hardenable material in the gel phase could be advantageously done by carrying a small quantity of hardenable material in a small tank directly on the running tool using a pressure accumulator or pumping fluid through the drillstring to maintain the said tank and hardenable material under pressure.

FIGS. 11 to 14 illustrate another improvement of the foldable composite tubular structure where the outer pipe 2a is made of two layers 2b and 2c which can be attached by interference fit when round or glued together by filling the interface when folded with adhesive at the same time the cavities 5a, 5b, 5c, 6a, 6b and 6c are filled with the unset hardening material.

Figure 12:
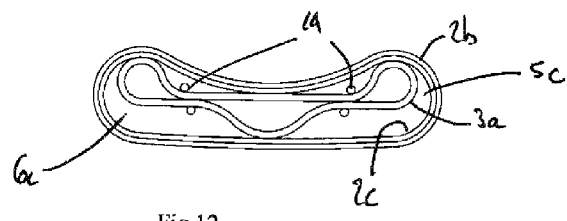
Figure 13:
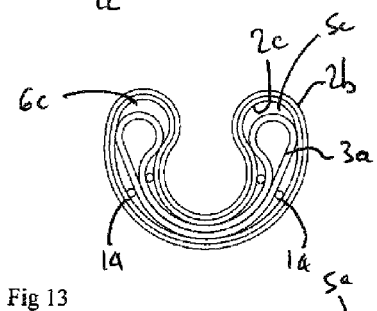
Figure 14:
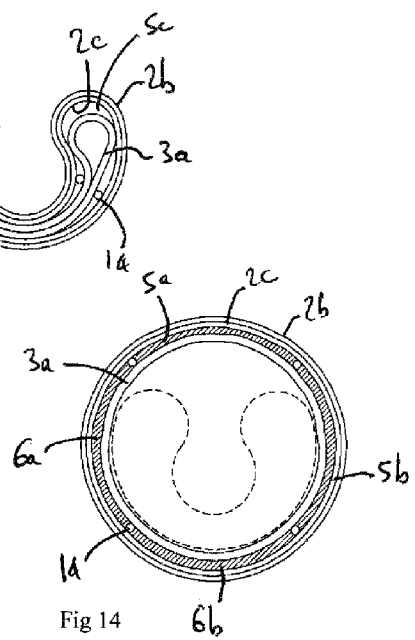

FIGS. 12 and 13 illustrate the configuration when the layers 2b and 2c are able to slide freely to minimize cold working during the folding-unfolding process and FIG. 14 shows the final rounded configuration where the layers 2b and 2c are in intimate contact and blocked from sliding by the adhesive.

In the use of composite tubular structure related to well casing as illustrated in FIG. 17A to 17C, advantageous solutions have been described to install a longitudinally folded tubular structure below the same deployed tubular structure by passing through it and, more importantly, to enhance the collapse resistance capability of the tubular structure by creating a pipe-in-pipe structure where the cavity(ies) between the two pipes or the two layers is (are) filled with an hardenable material.

In U.S. Pat. No. 7,490,676 of the applicant of which the entire disclosure is incorporated herein, a complete wellbore construction casing is built from length of tubular structure run successively through the previous one.

Preferably the length of tubular structure is continuous and wound on the reel for transportation as illustrated on FIG. 15. The intermediate portion 71 which as a section as illustrated in FIGS. 2A, 5B, 8 and 12 of the length is wound on the reel 70, and the reel is constructed to allow both ends to be straight, in another words, the ends do not have to be wound. Coming out from the outer wound layer is the folded bottom bell 73 (fold is at the bottom face) that will receive the next length of tubular structure in the case the well is drilled further after the present tubular structure is installed downhole. A foldable shoe 72 made of drillable material like aluminium or composite closes the bottom bell 73. Coming out off the side of the inner wound layer is the top end 74 of the tubular structure which is housed in all or in part within the thickness of the reel flange to provide access during deployment. The top end 74 comprises the hanger for the length of tubular structure 79 and 80.

FIG. 16A illustrates the unreeled and straightened length of tubular structure according to the invention. Unreeling will be achieved through an injector unit similar to well known coiled tubing injector unit. The unit will be similar to the one illustrated in FIG. 5 except that it does not have to modify the section, only the three straighteners/tensionners 19 are needed.

The length of tubular structure which can be as long as few thousand meters comprise, at its top end, a hanger section 74. Advantageously the diameter of the hanger section 74 is reduced by locating two folds 75, 180 deg apart. Two hanging areas 76 are located on both external section of the 8 shaped profile of the hanger section 74, to engage with a corresponding internal hanging profile 77 on the internal surface of the deployed bell (73a as shown on FIG. 16B) of the previously run length of tubular structure. Then the intermediate folded section links the top end 74 to the bottom end folded bell 73 which advantageously feature only one fold. Last at the bottom a folded drillable shoe 72 closes the bottom end.

FIG. 16B illustrates the deployed length of casing of FIG. 16A. Deployment will be achieved by fluid pressure. The top hanger section 74A is now round and engaged in the bell 73A of the previously run of which the shoe 72A has been drilled out. The intermediate section 71A and the bottom bell 73A are also round and the shoe 72A is deployed.

FIG. 16C illustrates a vertical section view of the intermediate section 71A where the cavity 4d of the pipe-in-pipe section is used to conduct the casing cement slurry to the shoe 72. After the cement sets and links the outer layer 2d to the inner layer 3d the pipe-in-pipe tubular structure exhibits a rigid sandwich wall which greatly increase the collapse resistance capability of the casing.

FIG. 17A to 17C illustrate the sequence of installation of a second length of tubular structure 80 according to the invention, in MonoBore/MonoDiameter configuration, as a liner of a previously set first length of tubular structure 79 passing through it. The previously set first length of tubular structure 79 has a bell 73B which has been drilled out while drilling the extension of the hole 85 to be cased with second length of tubular structure 80. The first length of tubular structure 79 can be of the type according to the invention and installed as a liner of another length of tubular structure with the same dimensions (not shown).

But first length of tubular structure 79 could also be of the conventional solid non expanded type installed as a first length of casing from the wellhead (not shown). MonoBore/MonoDiameter configuration permits the use of a first conventional casing from the wellhead or from a conventional liner hanger, then the successive lengths of tubular structure of the same diameter need to be expanded below the previous one using known expandable technologies. Two expandable technologies to increase the radial dimension of a tubular structure are well known today where the increase of the diameter or expansion of the tubular structure is obtain by either A) increasing the diameter of a small round tubular in the metal plastic range or B) by unfolding a longitudinally folded larger metal pipe.

In FIG. 17A, the length of tubular structure 80 is lowered through the previously set length of casing 79 on a running string 84 and running tool 83. The running tool 83 engages the hanger 82 which is the top end of the tubular structure 80. The intermediate portion 81 is folded tightly with numerous folds to feature an overall, somewhat rectangular, section compatible with reeling. The bottom end is equipped with a folded Bell 87 and a folded shoe 86.

In FIG. 17B, the length of tubular structure 80A has reached the proper depth with the hanger 82A facing the Bell 73B of the previous string 79. The hanger 82A is partially expanded to engage the hanging area 77 of the hanger (shown in FIG. 16B) with the matching hanging area of the bell 73B while leaving some flow-by section 88 for the return fluid. The intermediate portion 81A has been rounded up with pressure and also the bell 87A and shoe 86A. Then a cement slurry is pumped down the running string 84 and fed through the running tool 83A to the length of tubular structure 80A pipe-in-pipe cavity (ies) 4d to reach the shoe 86A. The cement can be over flooded and fill the annulus space between the length of tubular 80A and the borehole 85. Cementing of the tubular structure is not mandatory to achieve the composite tubular structure of the invention, only the cavity (ies) 4d must be filled with a hardenable material. During inflation and slurry circulation wellbore fluid can flow back to the surface through the flowby section 88.

In FIG. 17C, the cement has set and rigidify the wall of the tubular structure 80b. Prior to pull the running tool 83a, the hanger 82b is fully expanded in sealing contact with bell 73b achieving sealing integrity of the wellbore casing. The well is then ready to be either completed or further drilled by drilling out the shoe 86A.

As we have seen, the use of tubular structure with sandwich wall for casing a well offers many advantages but, it is requiring a dedicated construction of the tubular structure which might not be readily available everywhere immediately.

Referring to FIG. 18A an pipeline/flowline is shown, the multi-layered steel structure of pipe, or pipe-in-pipe is longitudinally folded 11 in a flattened shape, so that the inertia is minimized on a preferential axis in order to be able to be wound on a reduced diameter spool, and on the other hand, and additionally to facilitate the laying and the underwater connections. When folded, the inner pipe 111 internal surface can be in contact on most part of it to allow the use of high capacity tensioner 120. The inner pipe can contain a thin stainless steel liner 114 to provide corrosion protection. The outer pipe 112 has also most of its internal surface in contact with innerpipe 111 outside surface to again transmit tension from tensioner 120. Bulkhead 117 can be also made with small pipe 113 which could be used to circulate a warm fluid to fight hydrate formation in cold environment oil & gas flowline/pipeline.

The flattened pipeline/flowline can be reeled easily on small size reel 118 and 119 transportable on roads as shown of FIGS. 19A and 19C (spools not shown for clarity). Cavities 115 and 116 between the pipe-in-pipe can be filed after deployment with hardening material containing insulation compound like spherical Styrofoam or other known insulating particles.

The composite tubular structure reel-able according to the invention can also found applications in land pipeline, for ease of transportation and unreeling and puling through a partially fully excavated trench. After installation at the proper location and circulation and hardening of the interlayer material the composite tubular structure offers a good resistance to external loading. Also in some application where the weight of the steel needs to be reduced, the layers of the steel pipe-in-pipe can be relatively thin and the strength of the pipeline is obtained by filling the cavities with High Performance concrete which not only will provide strength in collapse resistance associated with the steel layer but also will provide strength in internal pressure.

In case of offshore underwater pipeline/flowline, the composite tubular structure according to the invention can be used advantageously in very deep water where J laying is normally used. In very deep water the tension is very high since the weight of the pipe in the water depth has to be supported. Also external pressure is high where the pipe touchdown which combine with the sharp radius of the curvature in the elastic range make collapse resistance capability critical. The solution is to lay the pipe full of water but this add tension. Also since the pipe is made of finite length of joint welded on the laying vessel, material grade cannot really exceed 65 ksi yield without creating difficulties to the field welding operation. Since the composite tubular structure according to the invention is of continuous length, higher yield material can be used to at least 80 ksi reducing the weight for a given tension capability . . . and in consequence reducing the tension as well. In consequence full of water laying can be done with minimal horizontal tension which in deepwater has to be generated by thrusters with high energy cost.

FIGS. 19A through 19C illustrate a specific J laying operation where the deployment of the added section from one reel is immediately deployed and the pipe-in-pipe cavities are grouted. A pulling head 130 is secured to the bottom end of the underwater pipeline/flowline with a tension cable 131 attached to a fix point (not shown). Spooled length 118 is added after a tie-in connection 132 has been made and already went underneath the water surface 127. Even if the pipe material has a yield higher than 65 ksi, the material of the Tie-in connection will be 65 ksi or less for welding practicality and also the two piped of the pipe-in-pipe will be merged to a solid thicker pipe to facilitate the tie-in. The three rollers straightener-tensioner 120 with three sets of roller 121 maintain the pipe laying tension while the laying vessel (not shown) move forward by pressing on the flattened section. As shown on FIG. 19B the spooled length has another pulling head 133 with a cable 134 and a winch (not shown) to maintain the tension while the straightener/tensioner 120 is open to let the pulling head 133 passing through. Through the cavity communication outlets 136 below the pulling head 133, the cavity are grouted with the proper hardenable material while the flattened internal pipe is inflated. Then the pulling head 133 is removed and a new spooled length 119 is added having another pulling head 135. The displacement of the laying vessel (not shown) can resume.

Generally, the composite deployable tubular structure of the invention can be advantageously used for downhole well equipment which are larger than the borehole that they have to go through, such as: (1) enlarged chamber like side pocket mandrel to receive downhole retrievable equipments such as pump, safety valves, etc. . . . (2) multilateral junction, etc.; (3) bells for suspending next length of casing in monobore technology and any other equipment.

While the improvements of composite tubular structure has been shown in some of its forms, it should be apparent to those skilled in the art that it is not so limited, but it is susceptible to various changes without departing from the scope of the invention. For instance methods or process using the system can be derivated.

The invention claimed is:

1. A high collapse resistance foldable composite tubular structure comprising:
   a longitudinally deployable by fluid pressure between a folded configuration and
   a round deployed configuration,
   having a radial dimension increasing between said folded configuration and said deployed configuration,
   having a portion of the wall of the tubular structure wall which includes at least two attached structural pipes mostly apart in said deployed configuration bordering an intermediate cavity filled with a hardenable material,
   wherein said intermediate cavity is vacuumed prior to the filling with hardenable material.

2. A structure according to claim 1, wherein the volume of said intermediate cavity is substantially equal when the tubular structure is in said folded configuration and said deployed configuration.

3. A structure according to claim 1, wherein the volume of said intermediate cavity is substantially equal when the tubular structure is wound on a reel and when the structure is in said deployed configuration.

4. A structure according to claim 1, wherein said structure is a wellbore casing and the hardening material is kept under pressure and hardening material is supplied to compensate setting shrinkage.

5. A structure according to claim 1, wherein at least one of the structural pipe is made of at least two layers.

6. A structure according to claim 1, wherein the two layers of said at least one of the structural pipe are prevented to slide with regard to one another by an interference fit or an adhesive.

7. A high collapse resistance foldable composite tubular structure comprising:
   a longitudinally deployable by fluid pressure between a folded configuration and
   a round deployed configuration,
   having a radial dimension increasing between said folded configuration and said deployed configuration,
   having a portion of the tubular structure wall which includes at least two attached structural pipes mostly apart in said deployed configuration bordering an intermediate cavity filled with a hardenable material,
   wherein the volume of said intermediate cavity is substantially equal when the tubular structure is in said folded configuration and said deployed configuration.

8. A structure according to claim 7, wherein the volume of said intermediate cavity is substantially equal when the tubular structure is wound on a reel and when the structure is in said deployed configuration.

9. A high collapse resistance foldable composite tubular structure for wellbore casing, comprising a longitudinally deployable by fluid pressure between a folded configuration and a round deployed configuration, comprising at least two attached structural pipe mostly apart in said deployed configuration bordering an intermediate cavity filled with a hardenable material, lowered through a previously installed casing with a common diameter having a bottom bell with a diameter larger than said common diameter, said structure having a largest transverse dimension smaller that the internal diameter of said preceding casing in said folded configuration and having the common diameter in said deployed configuration wherein the top end of said structure is housed within said bottom bell.

10. A structure according to claim 9, wherein said top end, housed in said bell, can be sealed by one or more plastic deformation or swaging of rings so that external surface of each ring cooperates sealingly with the internal surface of said bell.

11. A high collapse resistance foldable composite tubular structure, comprising a longitudinally deployable by fluid pressure structure between a folded configuration and a round deployed configuration, having a radial dimension increasing between said folded configuration and said deployed configuration, having a portion of the tubular structure wall which includes at least two attached structural pipes mostly apart in said deployed configuration bordering an intermediate cavity filled with a hardenable material, wherein said structure is a wellbore casing and the hardening material is kept under pressure and hardening material is supplied to compensate setting shrinkage.

* * * * *